US011916305B2

(12) United States Patent
Chang et al.

(10) Patent No.: US 11,916,305 B2
(45) Date of Patent: Feb. 27, 2024

(54) SYSTEMS AND METHODS FOR MASSIVE PHASED ARRAYS VIA BEAM-DOMAIN PROCESSING (71) Applicant: LinQuest Corporation, Herndon, VA (US)

(72) Inventors: Donald Chang, Thousand Oaks, CA (US); Stuart Bockman, Torrance, CA (US)

(73) Assignee: LinQuest Corporation, Herndon, VA (US)

( * ) Notice: Subject to any disclaimer, the term of this patent is extended or adjusted under 35 U.S.C. 154(b) by 435 days.

(21) Appl. No.: 17/362,685

(22) Filed: Jun. 29, 2021

(65) Prior Publication Data
US 2022/0006189 A1  Jan. 6, 2022

Related U.S. Application Data (60) Provisional application No. 63/047,092, filed on Jul. 1, 2020, provisional application No. 63/054,534, filed on Jul. 21, 2020.

(51) Int. Cl.
*H01Q 3/38* (2006.01)
*H01Q 1/28* (2006.01)

(52) U.S. Cl.
CPC .............. *H01Q 3/38* (2013.01); *H01Q 1/288* (2013.01)

(58) Field of Classification Search
CPC ................................. H01Q 3/38; H01Q 1/288
USPC ........................................................ 342/354
See application file for complete search history.

(56) References Cited

U.S. PATENT DOCUMENTS

| 7,239,276 B1 * | 7/2007 | Bonanni ................ H01Q 1/288 342/372 |
| 9,356,358 B2 | 5/2016 | Chang et al. |
| 10,361,775 B2 | 7/2019 | Chang |
| 10,490,892 B2 | 11/2019 | Chang |
| 10,637,605 B2 | 4/2020 | Chang et al. |
| 10,903,884 B2 * | 1/2021 | Shim .................... H04B 7/0626 |

FOREIGN PATENT DOCUMENTS

| CN | 101765785 A * | 6/2010 | ............. G01S 19/21 |
| WO | WO-2017124004 A1 * | 7/2017 | ............... H01Q 1/06 |

* cited by examiner

*Primary Examiner* — Harry K Liu
(74) *Attorney, Agent, or Firm* — MORRISON & FOERSTER LLP (57) ABSTRACT

A method generates a dynamic tracking beam from an N-element receiving phased array antenna with a digital-beam-forming (DBF) network, N being an integer greater than 100, by performing digital beam forming to capture a desired signal from a moving source via the N-element phased array, including digitally multiplying received signals in the N-elements by a tracking beam beam weight vector (BWV) for the tracking beam, wherein the tracking beam BMV comprises N I/Q components; reading M pre-stored spot beam BWVs for M contiguous spot beams from a memory; determining a new tracking beam BWV for the tracking beam in a next update, wherein the new tracking beam BWV is a weighted sum of the M pre-stored spot beam BWVs of the M contiguous spot beams; and loading the new tracking beam BWV to a buffer.

18 Claims, 7 Drawing Sheets

SYSTEMS AND METHODS FOR MASSIVE PHASED ARRAYS VIA BEAM-DOMAIN PROCESSING

CROSS REFERENCE TO RELATED APPLICATIONS

This application claims the priority of U.S. Provisional Application No. 63/047,092 filed Jul. 1, 2020, and U.S. Provisional Application No. 63/054,534 filed Jul. 21, 2020, the entire contents of each of which are incorporated herein by reference.

FIELD OF THE INVENTION

This disclosure relates generally to phased array antennas and, more specifically, digital beam forming networks for phased array antennas.

BACKGROUND OF THE INVENTION

In antenna theory, a phased array usually means an electronically scanned array, a computer-controlled array of antennas which creates a beam of radio waves that can be electronically steered to point in different directions without moving/gimballing the antennas. In a receiving (Rx) array antenna with hundreds of regularly spaced array elements, a stream of radio frequency (RF) signals from a desired source in a coverage area is captured by the individual array elements with the correct phase relationship so that the RF waves from the separate antenna elements add together coherently to increase the reception sensitivity in a desired direction, while cancelling to suppress radiation from undesired directions in the same coverage area. In a phased array, the captured RF signal power from the array elements are fed to devices called phase shifters in a beam forming network (BFN), controlled by a controller, which can alter the phase electronically, thus steering the Rx beam of radio waves to a different direction.

In phased arrays with digital beam forming (DBF) networks, the phase-shifting mechanisms in array elements are implemented by digital multipliers in base-band either via software in digital processors such as DSPs and FPGAs, digital circuits in ASICs, and/or combinations of both. As a result, implementing multiple concurrent beams becomes a cost-effective feature for Rx phased arrays. These concurrent beams can be multiple spot beams, shaped beams, agile hopping beams, tracking beams, area coverage beams, and/or combinations of all above.

SUMMARY OF THE INVENTION

According to various embodiments, systems and methods include beam-domain processing in which beam forming and shaping for a phased array antenna with a digital-beam-forming (DBF) network is done by optimizing based on beam weight vectors from selected Nb beams. Since the number of selected beams, Nb, can be (significantly) less than the number of antenna elements, optimization on the selected beams, rather than on the antenna elements, provides significant computation savings.

According to various embodiments, a method for generating a dynamic tracking beam from an N-element receiving phased array antenna with a digital-beam-forming (DBF) network, N being an integer greater than 100, includes: performing digital beam forming to capture a desired signal from a moving source via the N-element phased array, including digitally multiplying received signals in the N-elements by a tracking beam beam weight vector (BWV) for the tracking beam, wherein the tracking beam BMV comprises N I/Q components; reading M pre-stored spot beam BWVs for M contiguous spot beams from a memory; determining a new tracking beam BWV for the tracking beam in a next update, wherein the new tracking beam BWV is a weighted sum of the M pre-stored spot beam BWVs of the M contiguous spot beams; and loading the new tracking beam BWV to a buffer.

In any of these embodiments, determining the new tracking beam BWV can include optimizing based on performance constraints associated with desired performance of the tracking beam in the next update, wherein the performance constraints comprise at least one of desired beam pointing direction, array gain at the beam peak, desired null directions, side lobe levels, and minimizing phase and amplitude jumps during beam transition for the next update of the tracking beam BWV.

In any of these embodiments, the performance constraints can include minimizing phase and amplitude jumps during beam transition for the next update of the tracking beam BWV.

In any of these embodiments, determining the new tracking beam BWV can include calculating a linear combination of the M pre-stored spot beam BWVs by a weighting vector having M complex components.

In any of these embodiments, the weighting vector can be generated by minimizing a cost function.

In any of these embodiments, digital beam forming can be performed on a first platform and the weighting vector is generated on a second platform that is remote from the first platform.

In any of these embodiments, the first platform can be a moving platform and the second platform can be a ground-based platform.

In any of these embodiments, the first platform can be an air-platform or a satellite.

In any of these embodiments, the memory can be a local memory of the first platform.

According to some embodiments, a system includes an N-element receiving phased array antenna with a digital-beam-forming (DBF) network, N being an integer greater than 100, one or more processors, memory, and one or more programs stored in the memory for execution by the one or more processors for: performing digital beam forming to capture a desired signal from a moving source via the N-element phased array, including digitally multiplying received signals in the N-elements by a tracking beam beam weight vector (BWV) for the tracking beam, wherein the tracking beam BMV comprises N I/Q components; determining a new tracking beam BWV for the tracking beam in a next update, wherein the new tracking beam BWV is a weighted sum of M pre-stored spot beam BWVs of the M contiguous spot beams; and loading the new tracking beam BWV to a buffer.

In any of these embodiments, determining the new tracking beam BWV can include optimizing based on performance constraints associated with desired performance of the tracking beam in the next update, wherein the performance constraints comprise at least one of desired beam pointing direction, array gain at the beam peak, desired null directions, side lobe levels, and minimizing phase and amplitude jumps during beam transition for the next update of the tracking beam BWV.

In any of these embodiments, the performance constraints can include minimizing phase and amplitude jumps during beam transition for the next update of the tracking beam BWV.

In any of these embodiments, determining the new tracking beam BWV can include calculating a linear combination of the M pre-stored spot beam BWVs by a weighting vector having M complex components.

In any of these embodiments, the weighting vector can be generated by minimizing a cost function.

In any of these embodiments, the system can include a first platform that comprises the phased array antenna and a second platform that is remote from the first platform, wherein the digital beam forming is performed on the first platform and the weighting vector is generated on the second platform.

In any of these embodiments, the first platform can be a moving platform and the second platform can be a ground-based platform.

In any of these embodiments, the first platform can be an airborne platform or a satellite.

In any of these embodiments, the M pre-stored spot beam BWVs are stored in a local memory of the first platform.

DETAILED DESCRIPTION OF THE PREFERRED EMBODIMENT

According to various embodiments, systems and methods described herein perform beam optimizing and/or beam shaping for phased array antennas using beam domain optimization that includes optimizing on weighted sums of radiation patterns from selected Nb beams. An alpha vector comprising only Nb components is used in the optimization of beam-domain processing. By optimizing on only Nb components, the systems and methods described herein can perform beam optimizing and/or shaping with much less computation than conventional systems that optimize on the antenna element level in which the parameters for each antenna element are optimized. This savings in computation per beam shape optimization can allow for a greater number of new beam shapes and/or positions per unit time.

According to various embodiments, systems and methods can effectively generate a tracking beam under the constraints of uploading very limited beam weight vectors (BWVs), for example, 20 BWVs, per minute via a feeder-link to a phased array on a satellite or an air platform. The techniques described herein, according to various embodiments, can improve the uploading capability, such as to over 500 new beam positions/shapes per minute for dynamic beams tracking moving users without any "amplitude and phase jumps" during beam transitions.

Various aspects of the invention are described below with reference to an exemplary receiving (Rx) array aperture with 1000 elements. However, it should be understood that the principles described herein are applicable to transmitting (Tx) phased arrays as well as any size of phased array antennas, including for example, phased array antennas with at least 100 elements. The principles described herein can be applied to a phased array antenna in any location, including satellite mounted, ground base mounted (e.g., antenna tower), ground vehicle mounted, air vehicle mounted, etc.

A beam position of a spot beam generated by a digital-beam-forming (DBF) network of the Rx aperture having 1000 elements comprises a unique beam weight vector (BWV) with 1000 complex in-phase and quadrature (I/Q) components (one I/Q component per antenna element). In a conventional scheme of generating a cluster of contiguous spot-beams to support a fast moving user by a processing facility on the ground, the BWVs of multiple contiguous spot beams are uploaded to the DBF network in a receiving mode on the satellite.

According to various embodiments, pre-existing BWVs of the beam positions covering a geographical area of interest are used. For the sake of illustration, the following uses the BWVs of a cluster of, say, 20 contiguous beam positions. In tracking a moving user in real time over a coverage area, an optimized BWV is generated for a dynamic spot beam based on a weighted sum of the radiation patterns or footprints of the 20 selected spot beams. This is done at least in part in a ground processing facility. The optimization of BWVs is done at the spot beam level, not the antenna element level, meaning that there are only 20 complex I/Q numbers to manipulate instead of 1000 complex I/Q numbers (the number of antenna elements in this example) as in a conventional approach. The optimization of BWVs at the spot beam level, according to the principles described herein, is referred to herein as beam domain optimization.

A new beam weight vector for tracking the moving target, NBWV (T), is a result of $$NBWV(T) = A1(T)*BWV1 + A2(T)*BWV2 + \ldots + A20(T)*BWV20 \quad (1)$$

where the set of 20 coefficients, [A1(t) ... A20(t)], is dynamically optimized and normalized for following the targeted moving user.

The 20 weighting parameters [A1(t), ... , A20(t)] are referred to as alpha parameters and the vector representing them is referred to as the alpha vector. A "slow varying" alpha vector and a slow-varying NBWV (T) characterize a tracking beam.

Because the optimization is performed in the beam domain, rather than element domain, only the complex numbers associated with the selected number of spot beams (e.g., 20 in this example) are uploaded to the DBF, instead of 1000 complex numbers as in conventional approaches. Thus, the uploading rate improvement will be about 50 fold more efficient. New beam weights in the element domain are generated at the antenna based on linear combinations of the alpha vector for the selected pre-existing spot beams on board. Optimizing a BWV for spot beams, the number of which is much less than the number of antenna elements, and generating the BWV for the antenna elements based on linear combination of the optimized spot beam BWV, can result in significant computation savings over conventional approaches. In addition, according to various embodiments, optimization constraints on the alpha vector can be exercised to minimize the amplitude and phase jumps for the tracking beam during the beam transition.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to devices or systems for performing the operations herein. The devices or systems may be specially constructed for the required purposes, may comprise a general purpose computer selectively activated or reconfigured by a computer program stored in the computer, or may include any combination thereof. Computer instructions for performing the operations herein can be stored in any combination of non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. One or more instructions for performing the operations herein may be implemented in or executed by one or more Application Specific Integrated Circuits (ASICs), Field Programmable Gate Arrays (FPGAs), Digital Signal Processing units (DSPs), Graphics Processing Units (GPUs), or Central Processing Units (CPUs). Furthermore, the computers referred to herein may include a single processor or may be architectures employing multiple processor designs for increased computing capability.

Figure 1:
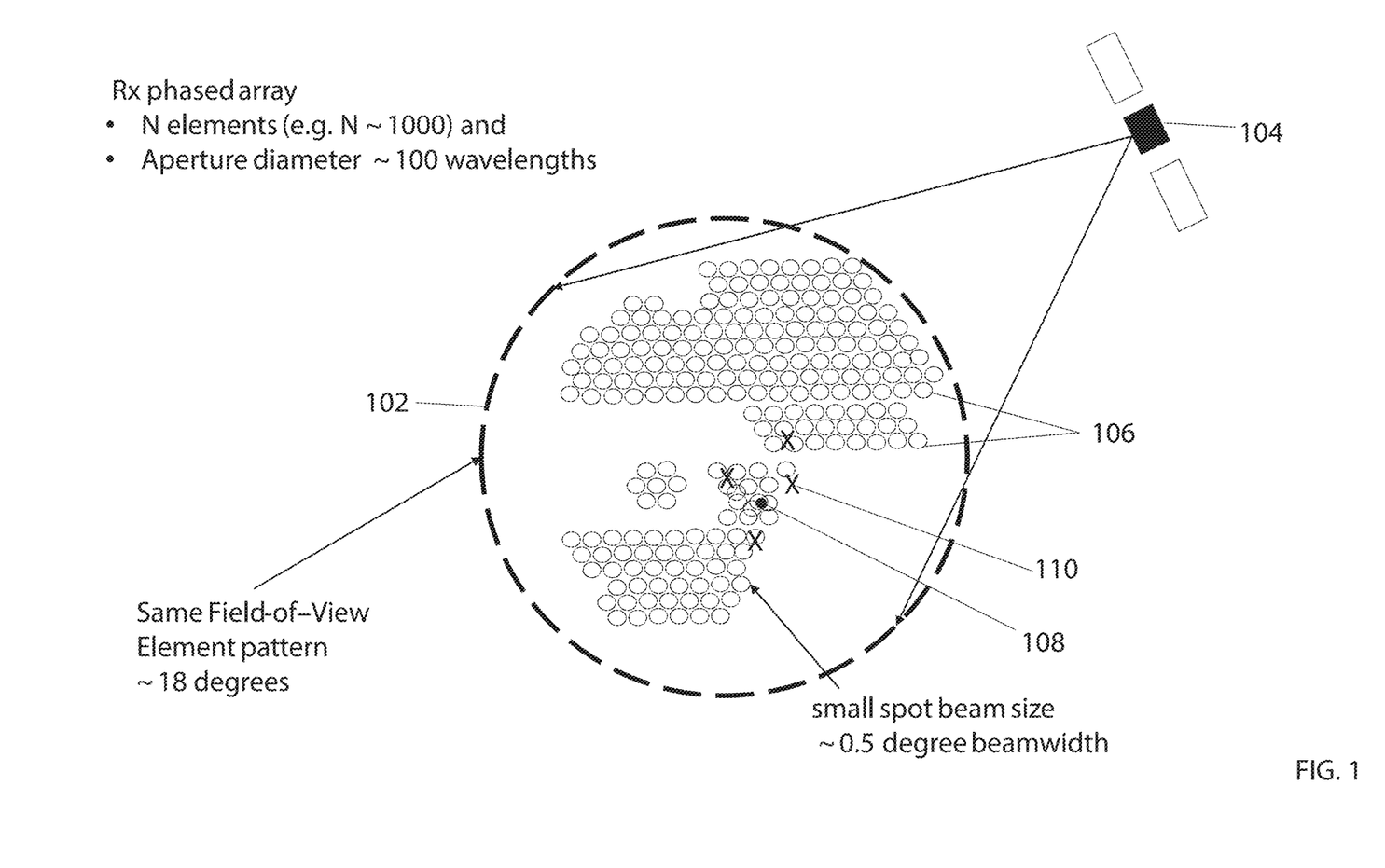
FIG. 1 illustrates spot beam footprints on earth and field of view (FOV) of a phased array antenna on a satellite, according to various embodiments.

FIG. 1 depicts an example of the field of view 102 of a single element of a high gain phased array antenna mounted on a satellite 104, including projected beam positions and beam footprints of multiple spot beams 106. The phased array antenna can include, for example, at least 1000 array elements, which can be fixed elements. In some embodiments, each array element can cover, for example, the entire earth disk. As a result, according to various embodiments, any spot on the earth can be "covered" 1000 times with the same magnitude "weighting" but various phases by the different elements. Beam forming can be used to target a signal 108 of interest and suppress undesired signals 110.

Figure 2:
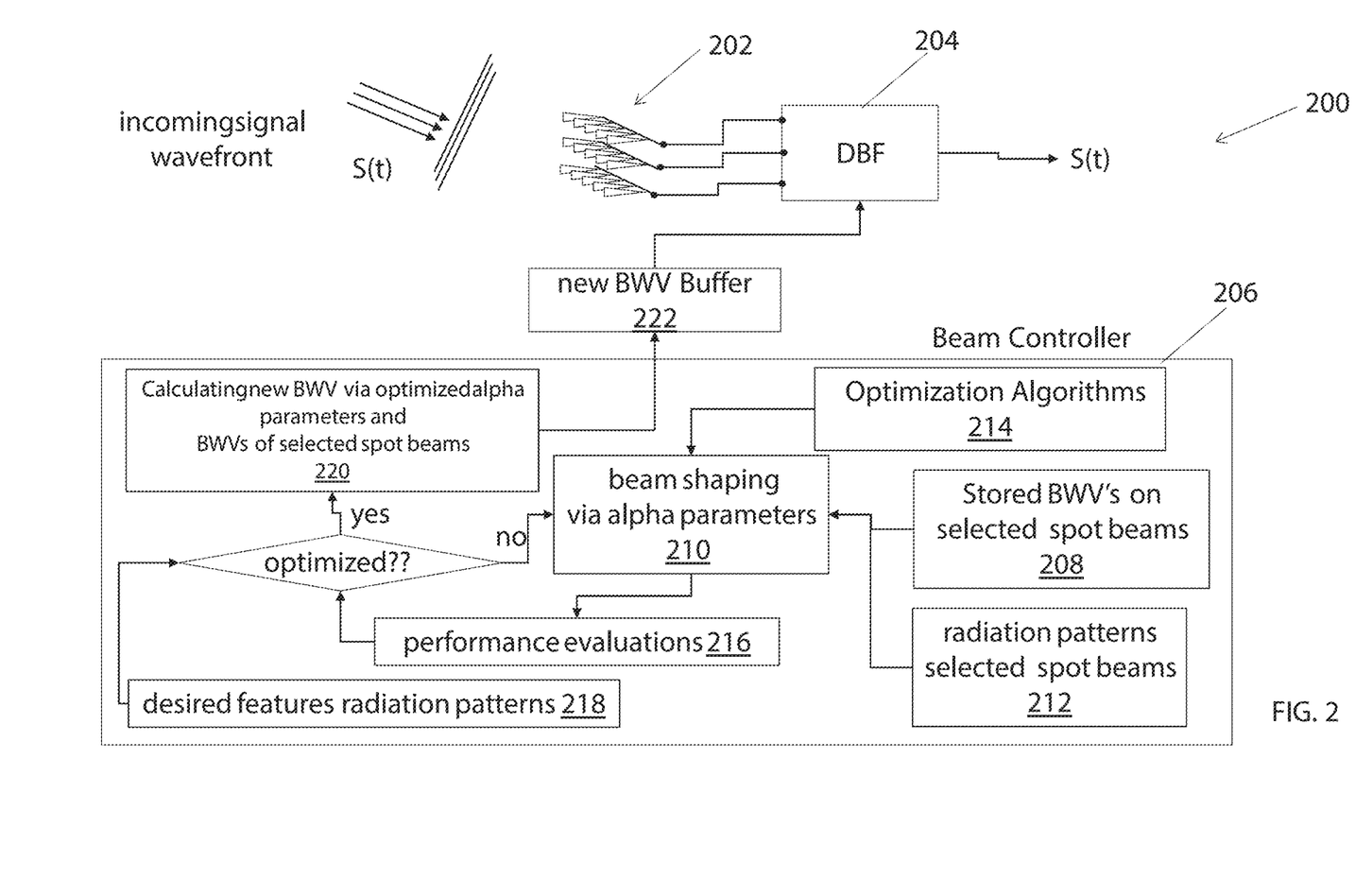
FIG. 2 is a functional block diagram of a digital-beam-forming phased array antenna in a receiving mode, according to various embodiments.

FIG. 2 depicts a functional block diagram of digital-beam-forming (DBF) for phased array antenna 200 in a receiving mode, according to various embodiments. A desired RF signal S(t) originating from a user terminal in a first direction arrives to the phased array aperture 202 in a form of a plane wave. A first array element captures all, say Nr, RF signals from various sources at different directions in a common field-of-view (FOV) of the phased array antenna, including the desired RF signal S(t) from the first direction. The captured Nr RF signals features a unique distribution on phase or time delays with respect to a fixed reference point on or near the phased array aperture. The aggregated signal stream from the Nr signal sources captured by the first element shall be referred to as the first element signal stream and designated as Sre1(t).

Similarly, a second array element captures the same Nr RF signals from various sources from different directions in a common field-of-view (FOV) of the phased array antenna, including the desired RF signal S(t) from the first direction. The captured Nr RF signals feature a different and unique distribution on phase or time delays with respect to a fixed reference point on or near the phased array aperture. The aggregated signal stream from the Nr signal sources captured by the second element shall be referred to as the second element signal stream and designated as Sre2(t).

The aggregated signal streams captured by the remaining array elements are similarly designated as Sre3(t), . . . , Sre1000(t).

In the depicted configuration, the digital beam forming (DBF) network 204 and its beam controller 206 are co-located (e.g., on the satellite, the ground base station, the vehicle, etc.). The digital beam forming (DBF) network 204 performs beam forming/shaping operations to coherently add the desired signal stream S(t) components in all 1000 element signal streams to output the desired signal stream S(t). As a result, each of the remaining Nr-1 signal components in the 1000 element signal streams will be added randomly. The beam forming/shaping operations include multiplications of the 1000 element signal streams by a first beam weighting vector (BWV1) to reconstitute the desired signal stream S(t) coming from the first direction.

The BWV1 for a spot beam is calculated based on the array geometry via a classic phased array antenna theorem to assure the associated peak gain and side lobe performance. However, when additional performance constraints are imposed, the receiving beam can be synthesized using antenna radiation (or reception) pattern optimization techniques. The additional performance constraints may include desired null directions, tracking nulls, orthogonal beam patterns, flat-top, maximizing beam efficiency, and/or others. To achieve the desired array performances with Np performance constraints imposed in iterative approaches, an optimized array with 1000 elements may require Np times of 1000 complex multiplications per processing loop. For example, it can take 50 to 500 loops to converge in estimating an optimized beam weight vector.

According to various embodiments, the beam-domain processing approaches described herein can include an intermediate step of selecting a cluster of spot beams over a coverage area of interest for synthesizing or optimizing a desired beam pattern. The BWV of the selected spot beams are stored in block 208 and provided to the beam shaping alpha parameter calculator 210. The desired beam pattern may be a coverage area beam, a flat top circular beam, a shaped beam with specified null depths and directions, a tracking spot beam, or others. Instead of using 1000 elements covering the same FOV, a fewer number of spot beams may be selected, such as Nsb contiguous and partially overlapping beams that cover a desired area, for the optimization and beam shaping. To achieve the desired array performances with Np performance constraints imposed in iterative approaches, an optimized array with, say, Nsb=20 pre-selected spot beam positions may require Np times of 20 complex multiplications per processing loop, rather than Np times 1000 complex multiplications per processing loop, which can represent a 50-fold savings in computational cost.

According to various embodiments, the DBF output with an optimized dynamic beam weight vector is expressed as follows;

$$Sropt(t,T)=A1(T)*Srb1(t)+A2(T)*Srb2(t)+A20(T)*Srb20(t) \quad (2)$$

where $$Sropt(t,T)=\text{NBWV}(T)*[Sre1(t),Sre2(t),\ldots,Sre1000(t)], \quad (2\text{-}1)$$

$$Srb1(t)=BWV1*[Sre1(t),Sre2(t),\ldots,Sre1000(t)], \quad (2\text{-}2)$$

$$Srb2(t)=BWV2*[Sre1(t),Sre2(t),\ldots,Sre1000(t)], \quad (2\text{-}3)$$

$$Srb20(t)=BWV20*[Sre1(t),Sre2(t),\ldots,Sre1000(t)] \quad (2\text{-}4)$$

Two different time scales are included in these expressions. The "t" represent a time scale for received signals with a scale in "nano-seconds" for signal with 100 MHz bandwidth while the "T" is in a scale of "seconds" with a dynamic beam tracking a moving user.

In addition, the new beam weight vector can represented as $$\text{NBWV}(T)=A1(T)*BWV1+A2(T)*BWV2+\ldots+A20(T)*BWV20 \quad (1)$$

where the alpha parameters [A1(T), A2(T), ..., A20(T)] are optimized under a set of performance constraints.

The performance constraints can include one or more of: desired beam-peak level, beam pointing direction, sidelobe levels, and null directions of the desired antenna radiation/reception pattern. They can also include minimized or allowable amplitude and phase jumps during beam transitions for the dynamic beam.

In the beam controller 206, according to various embodiments, there is a beam shaping processor 210 that performs beam shaping under a set of performance constraints. The beam shaping processor 210 is set-up with a set of initial values of the alpha vector to calculate the weighted sum of the radiation patterns of a cluster of selected spot beams over observation grids. The outputs of the beam shaping processor 210 are dynamically evaluated against the desired Np performance constraints over the observation grids in simulator 216. Alpha parameters may be iteratively adjusted until the Np performance constraints are met.

According to some embodiments, using total cost minimization, when the outputs in a current loop do not meet the imposed constraints on a performance item, the deficiency is quantified as one of the Np cost functions. Cost functions are always defined as non-negative values. When a performance item of the current outputs from the beam-shaping processor meets the desired constraint, its corresponding cost function can be set to zero. Suitable cost minimization algorithms for beam shaping, according to various embodiments, are discussed in U.S. Pat. Nos. 10,637,605 and 10,361,775, the entire contents of each of which are incorporated herein by reference.

A total cost for the array performance is the sum of all the Np cost functions. The beam shaping processor 210 minimizes the total cost in the optimization loop for the next iteration following a selected optimization algorithm. In some embodiments, the selected optimization algorithm includes the steepest descent in calculating a next set of M weighting components.

When the total cost of the simulated radiation pattern becomes less than a preset threshold (e.g., a small positive number), the calculated beam shape under the current values of the alpha parameters can be considered optimized. The corresponding alpha vector is used to calculate a new BWV of the tracking beam in the targeting beam BWV calculator 220, which is loaded into a new BWV buffer for a next beam transition motion.

According to various embodiments, the BWVs of the selected spot beams stored in block 208 and the radiation patters of the selected spot beams stored in block 212 are provided to the beam shaping alpha parameter calculator 210, which calculates alpha parameters for the selected spot beams based on one or more optimization algorithms 214. The beam controller 206 can include a simulator 216 that simulates the antenna performance based on the alpha parameters from the alpha parameter calculator 210 and evaluates the performance against various performance parameters, including desired features of the radiation pattern 218, as discussed above. If the performance is not sufficiently optimized, then another set of alpha parameters can be generated and evaluated. If the performance is sufficiently optimized, then a new tracking beam BWV is calculated via a linear combination of the optimized spot beam BWVs in the targeting beam BWV calculator 220. The new tracking beam BWV is loaded into a buffer 222 and used by the DBF 204 to generate the desired output signal S(t).

Figure 3:
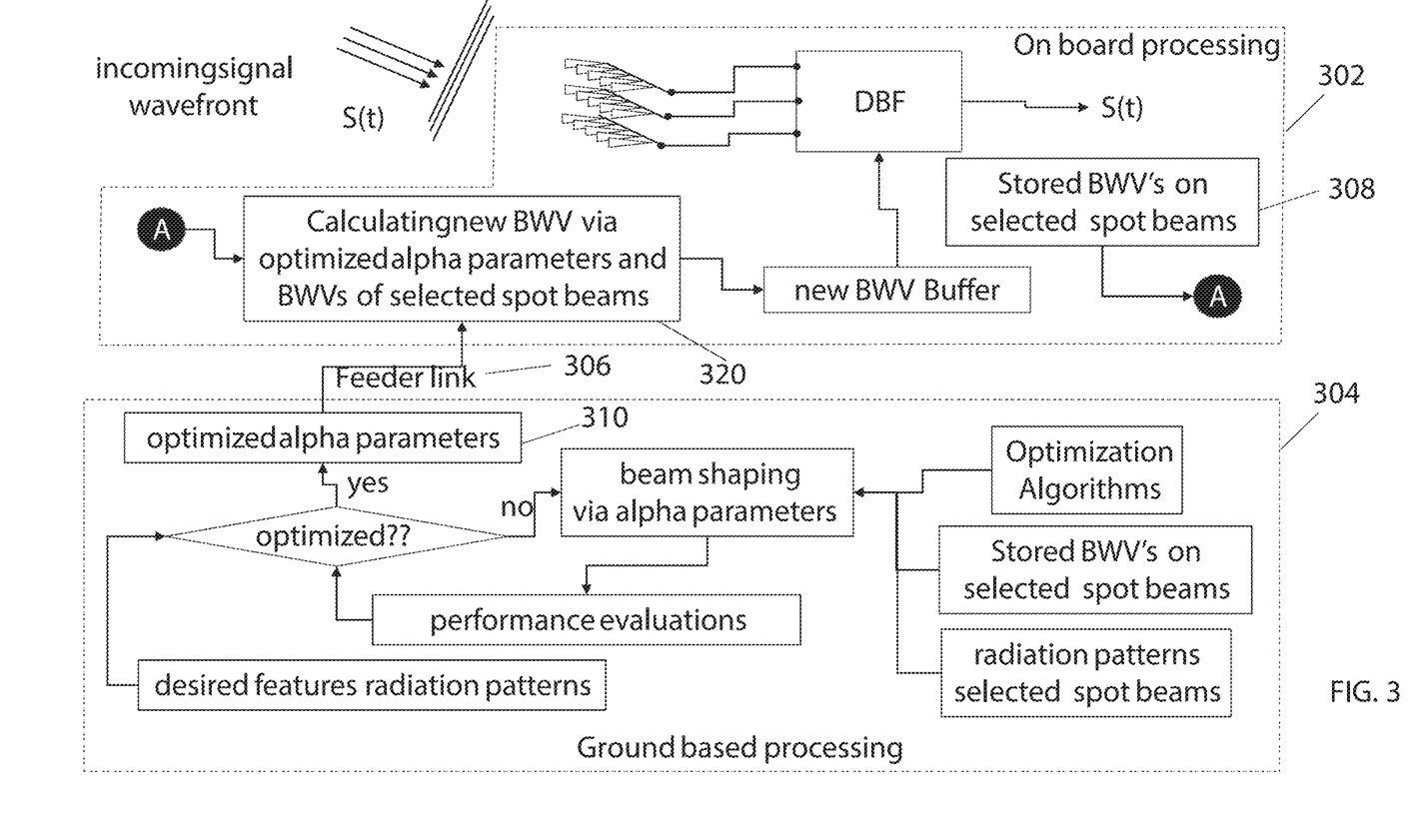
FIG. 3 is a functional block diagram of a digital-beam-forming phased array antenna in a receiving mode with remote optimization processing, according to various embodiments.

FIG. 3 depicts a functional block diagram of a digital-beam-forming (DBF) phased array antenna in a receiving mode, according to various embodiments. This block diagram is similar to that in FIG. 2 except that the DBF network and a portion of its beam controller are physically placed on a first platform 3302 that is remote from a second platform 304 that generates the alpha parameters. The first platform 302 can be, for example, a moving platform, and houses the DBF processor and an Rx phased array antenna with, for example, 1000 elements. The moving platform may be ground based, airborne, or space-based. The second platform 304, which supports key performance functions of a beam controller, may be a fixed ground facility, or a moving platform on ground or airborne.

Relative to the configuration in FIG. 2, the first platform 302 can have additional storage 308 for a cluster of BWVs of selected spot beams, and the targeting beam BWV calculator 320 for calculating a new tracking beam BWV via an optimized alpha vector sent by the second platform 304 via a feeder-link 306 and the stored selected spot beam BWVs.

Relative to the configuration in FIG. 2, the second platform 304 can implement the optimization processing functions. In addition, local data storage 310 may be included as a buffer for optimized alpha parameters to be transported to the first platform via the feeder link 306. The feeder link 306 can be any suitable communication system for wirelessly communicating between the first and second platforms.

According to various embodiments, an optimized alpha vector for the example discussed above that includes around 20 complex numbers with I/Q components may change every few seconds for a tracking beam. The first platform 302 can calculate the corresponding optimized new tracking beam BWV on board for the 1000-element phased array based on the around 20 complex numbers received from the second platform 304 via the feeder link 306.

To illustrate an advantage of this approach relative to a conventional approach, in a conventional remote processing scheme, the feeder link supports transport of a new BWV with 1000 complex numbers with I/Q components every few seconds, which is a much higher data transmission demand relative to the system of FIG. 3.

Figure 4:
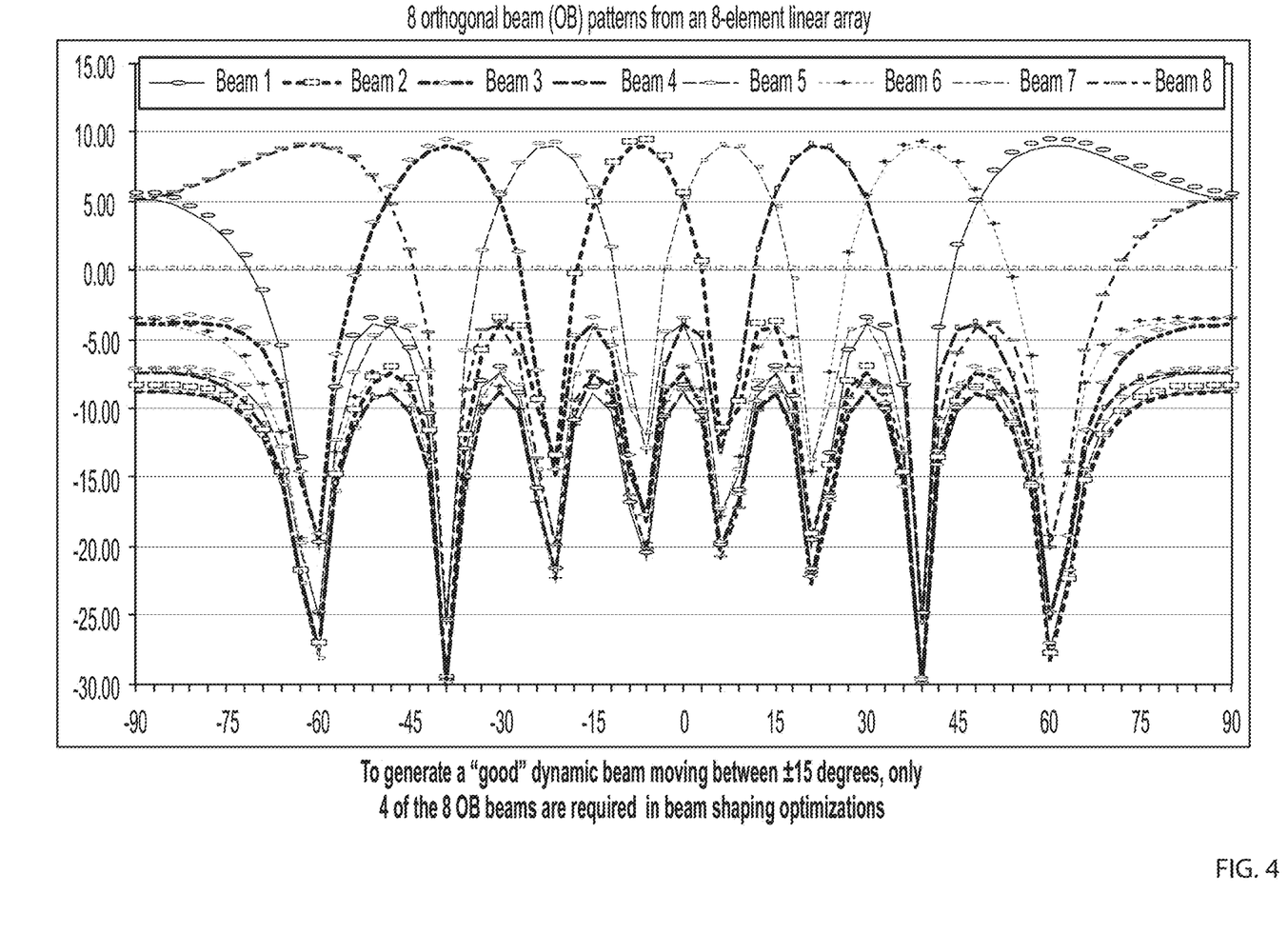
FIG. 4 illustrates simulated radiation patterns of contiguous beams from a linear array with eight elements, according to various embodiments.

FIG. 4 depicts 8 contiguous beams with orthogonal beam (OB) patterns from an 8-element linear array. The 8 elements of the linear array are spaced 0.5 wavelengths apart. They are simulated using an 8-to-8 Butler Matrix as a beam-former for 8 concurrent beams. The 8 beams are pointed to various directions in a theta axis ranging from −90° to +90°. The granularity of observation points in the theta axis is set on grid points 3° apart. The displayed apparent null depths range from −35 to −20 dB. However, null depths could be −100 to −60 dB if we chose 1° granularity in the observation points.

As can be observed from the chart, the beam peak of any one the 8 beams is always at a null of all other 7 beams. That is why the name of a set of 8 orthogonal beams.

In a conventional element-domain beam shaping optimization, shaping or optimizing of a desired beam is done under a set of performance constraints using the radiation patterns of 8 elements of the linear array according to the example of FIG. 4. In contrast, in a beam-domain processing according to the principles described herein, an optimized beam under the same set of performance constraints is achieved using the radiation patterns of 8 orthogonal beams of the linear array.

According to various embodiments, when beam performance only in a direction range from −15° to +15° is desired, the 4 central beams from the 8 orthogonal beams may be chosen for additional beam shaping optimization. This saves processing calculations by 50%.

In two dimension array geometries in a phased array, 8×8 elements in beam optimization operating over a 15° radius centered at boresite, the beam-domain methods according to the principles described herein include optimization of a linear combination of 16 orthogonal beam patterns. In contrast, the element-domain techniques include optimizing a linear combination of radiation patterns from all 64 elements. The saving in processing calculations for the beam-domain optimization relative to those via element-domain processing, is 75%.

Figure 5:
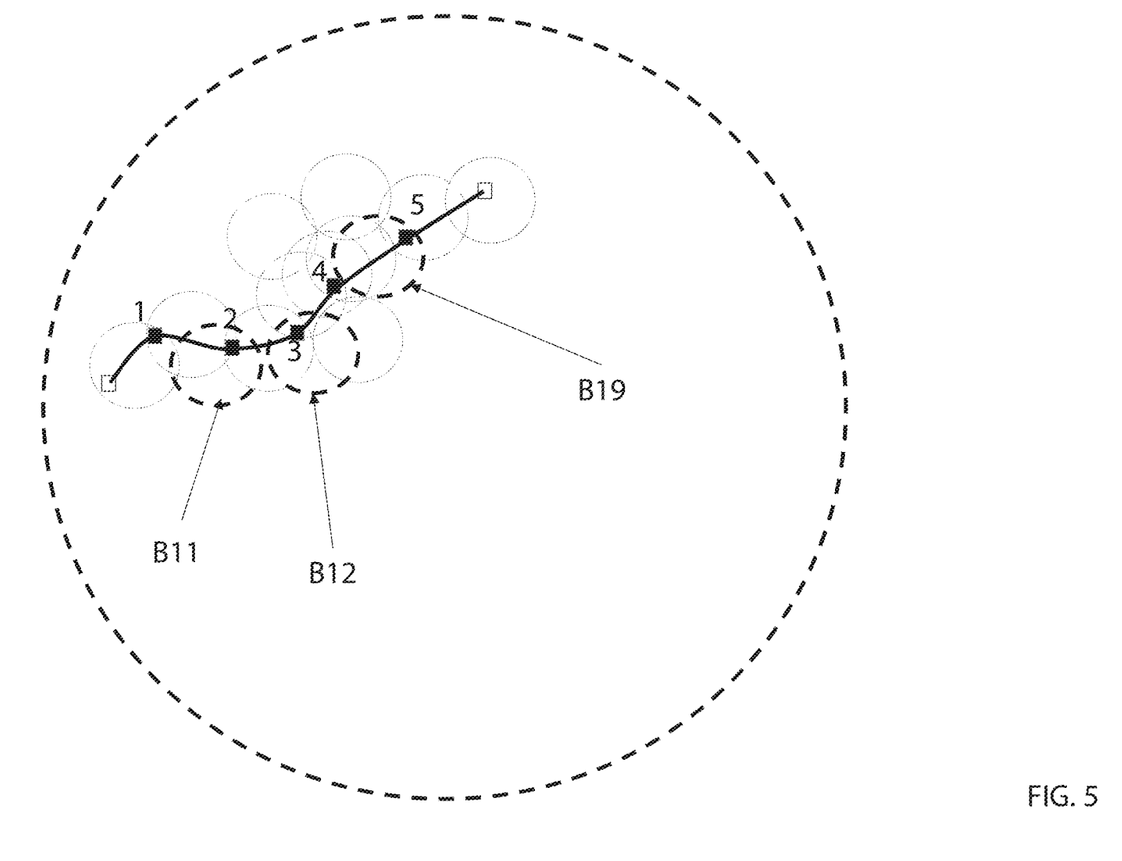
FIG. 5 illustrates beam-domain methods of generating a dynamic spot beam using a cluster of beam footprints of selected multiple spot beams, according to various embodiments.

FIG. 5 depicts a concept of forming a dynamic spot beam for a large phased array with N elements in tracking a fast moving user; similar to those depicted in FIG. 2 and FIG. 3 where an phased array with N=1000 is used to exemplify the operation concept. In FIG. 2 and FIG. 3, a cluster of M spot beams (for example, M=20) is selected; many are contiguous with beam footprint crossover levels at −3 dB or less. They may not be spot beams with orthogonal beam (OB) patterns. In some embodiments, 20 spot beams with different beamwidths are selected. Other embodiments comprise additional selected Ns "radiation patterns" from individual Ns of the N array elements, which are used for further beamforming, shaping, and/or optimization in concert with the selected M spot beams, where Ns<<N. In the following, M=20 and N=10 is used to demonstrate the operational concept.

In some embodiments, some of the selected Ns radiation patterns are from an auxiliary antenna, which is physically different from the phased array with N elements.

The optimization in a beam-domain processing for the dynamic beam includes shaping the beam to align its beam peak following the dynamic of the moving user. The shaped beam is a dynamic result of linear combinations of the same selected 20 spot beams and 10 more other radiation patterns with slow varying weighting parameters. The dynamics of the moving user are supplied to a beam controller for the phased array either in real time or pre-scheduled.

The 30 elected radiation patterns, 20 patterns from the 20 selected spot beams and 10 patterns from selected 10 individual radiating elements, for the beam-domain optimization can be fixed in a session of tracking operation. The 30 selected radiation patterns may also be individually replaceable as long as their BWVs are properly and identically indexed between the ones in a space borne phased array and those in the beam controller on ground.

Figure 6:
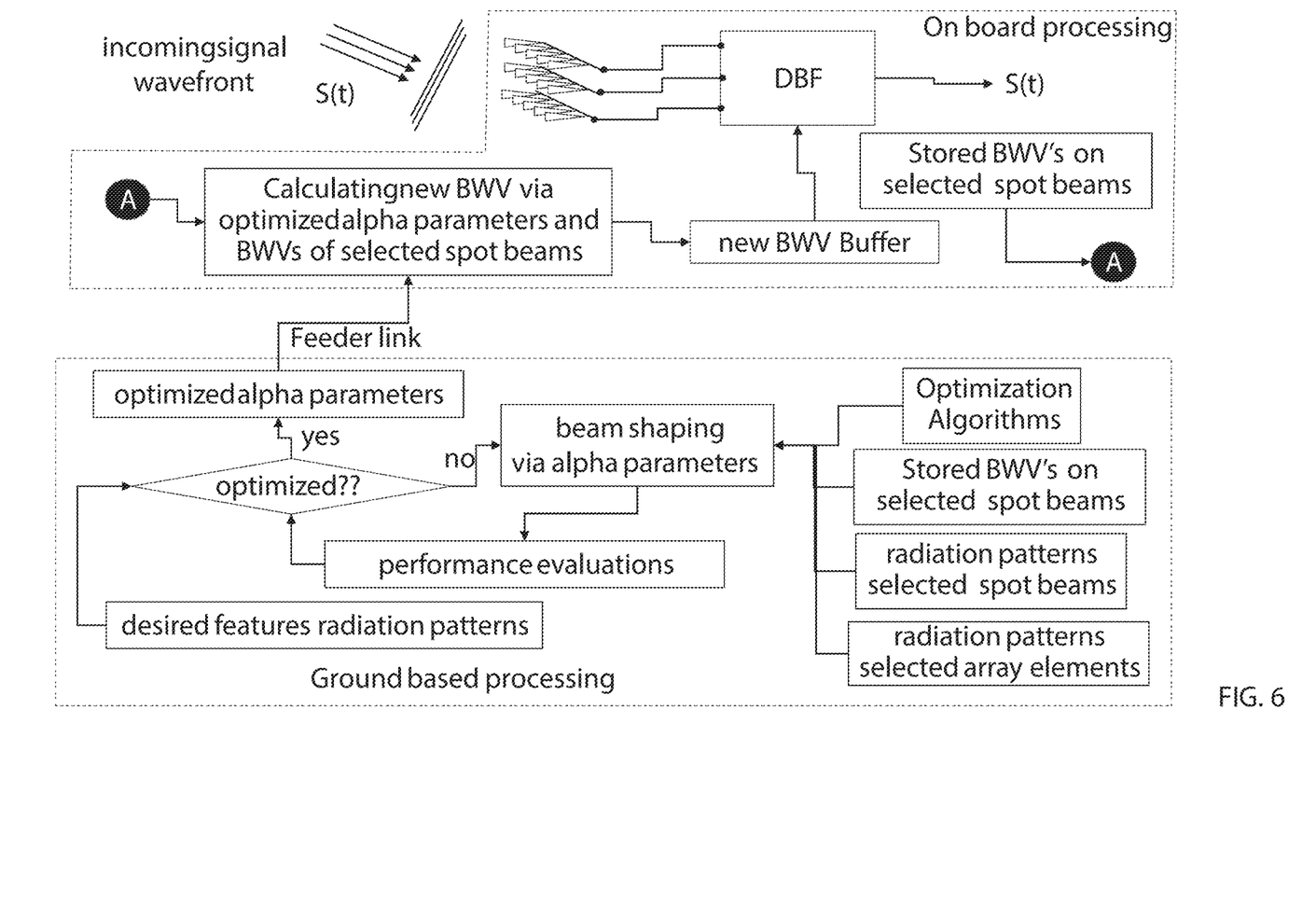
FIG. 6 is a functional block diagram of a digital-beam-forming phased array antenna in a receiving mode with remote optimization processing in which radiation patterns of selected array elements are used for generating the beam shaping alpha parameters, according to various embodiments.

FIG. 6 depicts an identical block diagram to that shown in FIG. 3, except the ground based processing 600 includes radiation patterns of selected array elements block 602. Block 602 enables the beam shaping (block 604) to have more degrees-of-freedom in shaping a desired beam pattern.

As noted above, a desired RF signal S(t) originating from a user terminal in a first direction arrives to the phased array aperture in a form of a plane wave. A first array element captures all, say Nr, RF signals from various sources from different directions in a common field-of-view (FOV) of the phased array antenna; including a desired RF signal from the first direction. Similarly, a second array element captures the same Nr RF signals from various sources from different directions in the common FOV of the phased array antenna, including the desired RF signal from the first direction. The captured Nr RF signals features a different and unique distribution on phase or time delays with respect to a fixed reference point on or near the phased array aperture. The aggregated signal stream from the Nr signal sources captured by the first and second elements are referred to below as the first second element signal streams and designated as Sre1(t) and Sre2(t), respectively. The aggregated signal streams captured by the remaining array elements are designated Sre2(t), . . . , Sre1000(t).

Similar to FIG. 3, the system illustrated in FIG. 6 includes the digital beam forming (DBF) network and a first portion of its beam controller co-located with the phased array antenna, while a second portion of the its beam controller is located remotely, such as on in a ground facility. The digital beam forming (DBF) network performs beam forming/shaping operations to coherently add the desired signal stream components S(t) in all 1000 element signal streams. As a result, each of the remaining Nr−1 signal components in the 1000 element signal streams will be added randomly. The beam forming/shaping operations comprise of multiplications of the 1000 element signal streams by a first beam weighting vector (BWV1) to reconstitute the desired signal stream S(t) coming from the first direction.

The BWV1 for a first spot beam for a phased array is calculated based on the array geometry via classic phased array antenna theorem to assure the associated peak gain and sidelobe performance. However, when more performance constraints are imposed, the receiving beam from the phased array can be synthesized using antenna radiation/reception pattern optimization techniques. To achieve the desired array performances with Np performance constraints imposed, a radiation pattern of the phased array with 1000 elements can be synthesized via iterative optimization approaches. Pattern synthesizing/shaping processes for a 1000-element array may require Np times of 1000 complex multiplications per iterative processing loop. It can take 50 to 500 iterative loops to converge in estimating an optimized beam weight vector under a set of 20 to 40 performance constraints for the 1000 element phased array.

There are many advanced optimization approaches in beam shaping. In the last two decades, convex optimization has been used in beam shaping or optimizing antenna radiation/reception patterns for phased arrays under a set of array performance constraints. The challenges for an efficient beam shaping or beam optimization are on how to formulate the desired performance constraints on a "convex" processing surface.

As noted above, the beam-domain processing described herein includes an intermediate step of selecting a cluster of spot beams over a coverage area of interest for synthesizing or optimizing a desired beam pattern. According to various embodiments, instead of using 1000 elements covering the same FOV, the following may be selected for the optimization and beam shaping: (1) around 20 contiguous and partially overlapped beams and (2) another set of 10 additional radiation patterns covering entire field-of-view as defined in radiation patterns-selected array elements block 602. To achieve the desired array performances with Np performance constraints imposed in iterative approaches to a collection of 30 selected radiation patterns covering an area of interest, an optimized array includes Np times of 30 complex multiplications per processing loop.

Accordingly, the DBF output with an optimized dynamic beam weight vector is expressed as follows;

$$Sropt(t,T)=A1(T)*Srb1(t)+A2(T)*Srb2(t)+ \ldots +A20(T)*Srb20(t)+A21(T)*Ss1(t)+ \ldots +A30(T)*Ss10(t) \quad (3)$$

where $$Sropt(t,T)=NBWV(T)*[Sre1(t),Sre2(t), \ldots ,Sre1000(t)], \quad (3\text{-}1)$$

$$Srb1(t)=BWV1*[Sre1(t),Sre2(t), \ldots ,Sre1000(t)], \quad (3\text{-}2)$$

$$Srb2(t)=BWV2*[Sre1(t),Sre2(t), \ldots ,Sre1000(t)], \quad (3\text{-}3)$$

$$Srb20(t)=BWV20*[Sre1(t),Sre2(t), \ldots ,Sre1000(t)] \quad (3\text{-}4)$$

and [Ss1(t), Ss2(t), ... Ss9(t), and Ss10(t)] are the set of received signals from the selected 10 additional radiation patterns.

In some embodiments, the chosen 10 elements, as defined in radiation patterns-selected array elements block 602, can be the $11^{th}$, the the $20^{th}$ elements of the phased array, in which case [Ss1(t), Ss2(t), ..., and Ss10(t)]=[Sre11(t), Sre12(t), ... Sre20(t)].

Two different time scales may be used. In equations (3) and (3-1), the "t" represent a time scale for received signals with a scale in "neon-seconds" for signal with 100 MHz bandwidth while the "T" is in a scale of "seconds" with a dynamic beam tracking a moving user.

In addition, the new weight can be presented as $$NBWV(T)=A1(T)*BWV1+A2(T)*BWV2+ \ldots +A20(T)*BWV20+A21(t)*BWVse1 \ldots +A30(t)*BWVse10 \quad (4)$$

where [BWVse1, ... , BWVse10] are the "beam-weight-vectors" representing the 10 selected array elements, as defined in radiation patterns-selected array elements block 602, and where the alpha parameters [A1(T), A2(T), ... , A30(T)] are optimized under a set of performance constraints.

When the $11^{th}$ element of the 1000 element phased array is selected as a first of the 10 chosen elements, the BWVse1 in equation (4) is a vector which includes 1000 components, and its $11^{th}$ component is set to unity and the rest 999 components are set to zeros. Similarly when the $20^{th}$ element of the 1000 element phased array is selected as a $10^{th}$ of the 10 chosen elements, the BWVse10 in equation (4) is a vector which includes 1000 components, and its $20^{th}$ component is set to unity and the rest 999 components are set to zeros.

The performance constraints can include one or more of desired beam-peak level, beam pointing direction, sidelobe levels, and null directions of the desired antenna radiation/reception pattern. The performance constraints can also include minimized or allowable amplitude and phase jumps during beam transitions for the dynamic beam.

In the remote beam controller in FIG. 6, the beam shaping processor 604 performs beam shaping under a set of performance constraints. The processor 604 is set-up with a set of initial values of the alpha vector to calculate the weighted sum of the radiation patterns of a cluster of selected spot beams over observation grids. Its outputs are dynamically evaluated against the desired Np performance constraints over the observation grids.

When the outputs in a current loop do not meet the imposed constraints on a performance item, the deficiency is quantified as one of the Np cost functions. Cost functions are always defined as non-negative values. When a performance item of the current outputs from the beam-shaping processor meets the desired constraint, its corresponding cost function shall be set to zero.

A total cost for the array performance is the sum of all the Np cost functions. The beam shaping processor 604 minimizes the total cost in the optimization loop for the next iteration following a selected optimization algorithm. When the total cost of the simulated radiation pattern becomes less than a preset threshold (a small positive number), the calculated beam shape under the current values of the alpha parameters is considered optimized. The corresponding alpha vector is then provided via a feeder link 606 to a BWV calculator 608 for calculating a new BWV, which shall be placed in a new BWV buffer 610 for a next beam transition motion.

Figure 7:
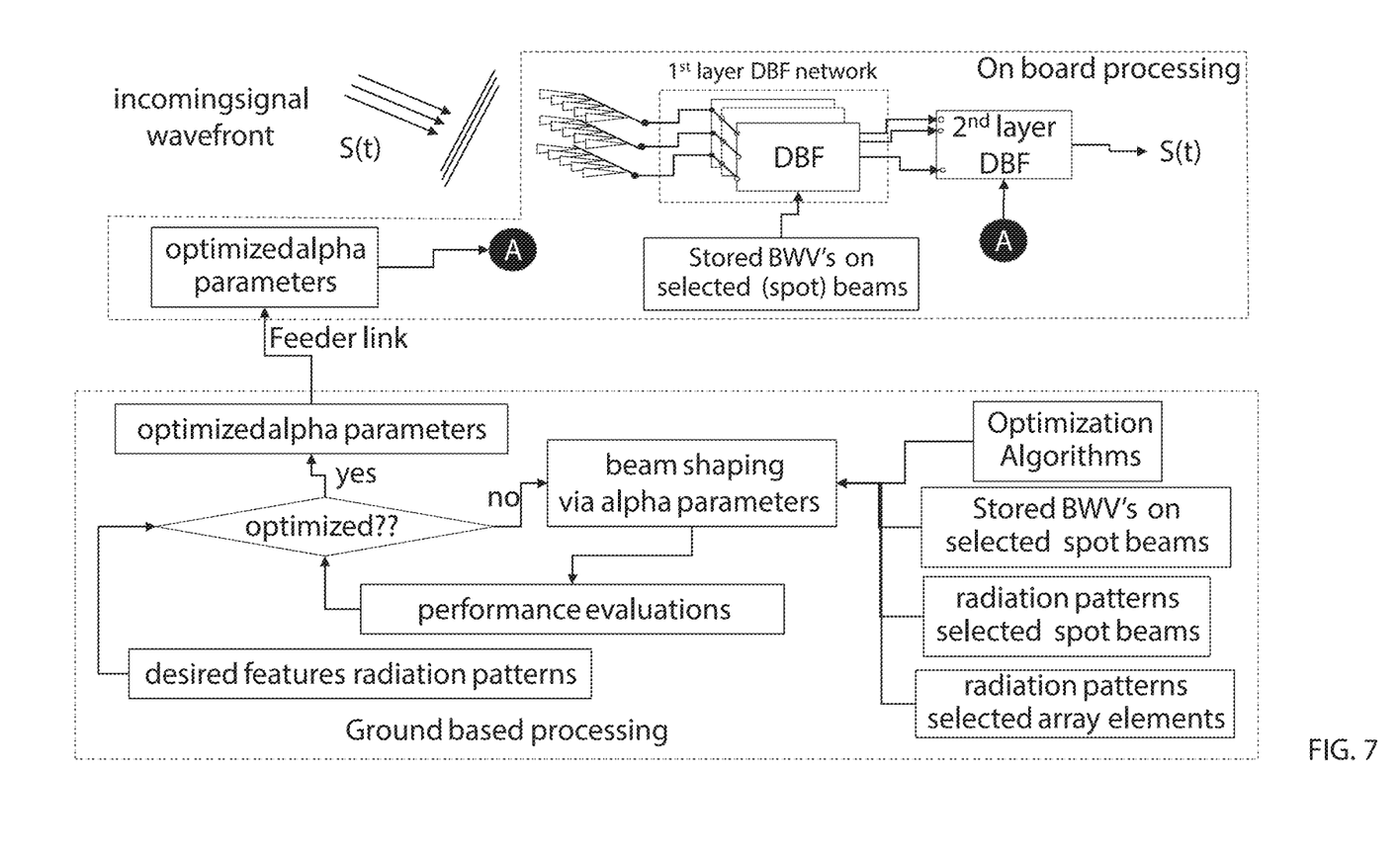
FIG. 7 depicts a functional block diagram of a digital-beam-forming phased array antenna in a receiving mode with a second layer DBF and remote optimization processing, according to various embodiments.

FIG. 7 depicts another block diagram similar to that shown in FIG. 3, except that it includes a 2nd layer digital-beam-forming network block 702, which is provided in the "on-board processing" 700 on a moving platform. In this embodiment, a first tracking beam is formed through an optimized linear combination of the outputs of the selected Nsb beams (Nsb is set to 20 in this example). The functional blocks in the "Ground based processing" 750 in FIG. 7 are identical to those in FIG. 3.

Similar to the approaches discussed above, the beam-domain processing includes an intermediate step of selecting a cluster of spot beams over a coverage area of interest for synthesizing or optimizing a desired beam pattern. The set of optimized alpha parameters is uploaded to the on-board processing 700 of the 1000-element phased array on the moving platform via the feeder link 704, and is used to form a first tracking beam in a second layer digital-beam-forming network 702.

In the following, the optimized alpha vector with 20 alpha parameters dictates the beam shape and beam position of the first tracking beam. For the first tracking beam receiving S(t), the received S(t) at T=nΔ is reconstituted via equation (5), which is implemented by the second layer DBF network 702;

$$S(t) = Sropt(t, n\Delta) \quad (5)$$
$$= A1(n\Delta)*Srb1(t) + A2(n\Delta)*Srb2(t) + \ldots +$$
$$A20(n\Delta)*Srb20(t)$$

where T=nΔ stands for the nth beam transition for the first tracking beam,
Srb1(t) is the output signal stream from the on-board DBF network for a selected first spot beam,
Srb2(t) is the output signal stream from the on-board DBF network for a selected second spot beam, and
Srb20(t) is the output signal stream from the DBF network for a selected 20th spot beam.

According to various embodiments, methods performed in the second layer DBF network 702 can include summing 20 weighted signal streams from the 20 selected spot beams directly from the on-board DBF network. In beam domain processing in this example, the second layer DBF network 702 can include only around 20, instead of 1000, multiplications per shaped beam.

Similarly, a second tracking beam can be formed concurrently using the same 20 selected spot beams. According to various embodiments, these two tracking beams can dynamically following two (nearby) mobile users and can be optimized for operating at a common frequency slot with minimized mutual interference. The peak of the first tracking beam can be at a null of the second tracking beam, and the peak of the second tracking beam can be at a null of the first tracking beam. They can be a set of dynamic orthogonal beams. Shaped beams with orthogonal beam (OB) patterns are extensively discussed in U.S. Pat. Nos. 9,356,358 and 10,490,892, the entire contents of each of which are incorporated herein by reference.

According to some embodiments, the Np selected spot beams are "static" beams, and the dynamic features of the first tracking beam following moving users result from an optimized first alpha vector that includes dynamic alpha parameters or weightings. The moving users include the desired user and undesired users.

It can be cost effective to generate additional concurrent beams from same selected Nsb beams. Some can be used by nearby designated user terminals, including moving users. Other can be used as diagnostic beams for enhancement of self-awareness of the moving platform and/or tracking the designated moving users.

The functional blocks described above with respect to FIGS. 2, 3, 6, and 7 can be implemented in any suitable way, including by one or more processors executing one or more programs stored in memory. Functional blocks can be implemented on the same computing system or on different computing systems. For example, the functional blocks of the beam controller 206 of FIG. 2 may be implemented on the same computing system (which can include a single processor or multiple processors), which can be the same computing system as that which implements the digital beam former 204 or can be a different computing system from that which implements the digital beam former 204. In embodiments in which the functional blocks are implemented on different platforms (e.g., first platform 302 and second platform 304 of FIG. 3), the functional blocks on a respective platform can be implemented on the same computing system (which can include one or more processors) or on different computing systems that are communicatively coupled. For example, with respect to first platform 302, the DBF may be implemented on the same processor as the BWV calculator or may be implemented on different processors.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference. For the purpose of clarity and a concise description, features are described herein as part of the same or separate embodiments; however, it will be appreciated that the scope of the disclosure includes embodiments having combinations of all or some of the features described.

What is claimed is:

1. A method for generating a dynamic tracking beam from an N-element receiving phased array antenna with a digital-beam-forming (DBF) network, N being an integer greater than 100, comprising:
performing digital beam forming to capture a desired signal from a moving source via the N-element phased array, including digitally multiplying received signals in the N-elements by a tracking beam beam weight vector (BWV) for the tracking beam, wherein the tracking beam BMV comprises N I/Q components;
reading M pre-stored spot beam BWVs for M contiguous spot beams from a memory;
determining a new tracking beam BWV for the tracking beam in a next update, wherein the new tracking beam BWV is a weighted sum of the M pre-stored spot beam BWVs of the M contiguous spot beams; and
loading the new tracking beam BWV to a buffer.

2. The method of claim 1, wherein determining the new tracking beam BWV comprises optimizing based on performance constraints associated with desired performance of the tracking beam in the next update, wherein the performance constraints comprise at least one of desired beam pointing direction, array gain at the beam peak, desired null directions, side lobe levels, and minimizing phase and amplitude jumps during beam transition for the next update of the tracking beam BWV.

3. The method of claim 2, wherein the performance constraints comprise minimizing phase and amplitude jumps during beam transition for the next update of the tracking beam BWV.

4. The method of claim 1, wherein determining the new tracking beam BWV comprises calculating a linear combination of the M pre-stored spot beam BWVs by a weighting vector having M complex components.

5. The method of claim 4, wherein the weighting vector is generated by minimizing a cost function.

6. The method of claim 4, wherein digital beam forming is performed on a first platform and the weighting vector is generated on a second platform that is remote from the first platform.

7. The method of claim 6, wherein the first platform is a moving platform and the second platform is a ground-based platform.

8. The method of claim 7, wherein the first platform is an air-platform or a satellite.

9. The method of claim 6, wherein the memory is a local memory of the first platform.

10. A system comprising:
an N-element receiving phased array antenna with a digital-beam-forming (DBF) network, N being an integer greater than 100, one or more processors, memory, and one or more programs stored in the memory for execution by the one or more processors for:
performing digital beam forming to capture a desired signal from a moving source via the N-element phased array, including digitally multiplying received signals in the N-elements by a tracking beam beam weight vector (BWV) for the tracking beam, wherein the tracking beam BMV comprises N I/Q components;
determining a new tracking beam BWV for the tracking beam in a next update, wherein the new tracking beam BWV is a weighted sum of M pre-stored spot beam BWVs of the M contiguous spot beams; and
loading the new tracking beam BWV to a buffer.

11. The system of claim 10, wherein determining the new tracking beam BWV comprises optimizing based on performance constraints associated with desired performance of the tracking beam in the next update, wherein the performance constraints comprise at least one of desired beam pointing direction, array gain at the beam peak, desired null directions, side lobe levels, and minimizing phase and amplitude jumps during beam transition for the next update of the tracking beam BWV.

12. The system of claim 11, wherein the performance constraints comprise minimizing phase and amplitude jumps during beam transition for the next update of the tracking beam BWV.

13. The system of claim 10, wherein determining the new tracking beam BWV comprises calculating a linear combination of the M pre-stored spot beam BWVs by a weighting vector having M complex components.

14. The system of claim 13, wherein the weighting vector is generated by minimizing a cost function.

15. The system of claim 13, comprising a first platform that comprises the phased array antenna and a second platform that is remote from the first platform, wherein the digital beam forming is performed on the first platform and the weighting vector is generated on the second platform.

16. The system of claim 15, wherein the first platform is a moving platform and the second platform is a ground-based platform.

17. The system of claim 16, wherein the first platform is an airborne platform or a satellite.

18. The system of claim 15, wherein the M pre-stored spot beam BWVs are stored in a local memory of the first platform.

* * * * *